(12) United States Patent
Cho et al.

(10) Patent No.: US 11,099,428 B2
(45) Date of Patent: Aug. 24, 2021

(54) DISPLAY APPARATUS

(71) Applicant: SAMSUNG ELECTRONICS CO., LTD., Suwon-si (KR)

(72) Inventors: Jin Hyun Cho, Seoul (KR); Go Hyun Kim, Yongin-si (KR); Sang Hyun Sohn, Suwon-si (KR); Jong Hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,715

(22) PCT Filed: Aug. 30, 2018

(86) PCT No.: PCT/KR2018/010065
§ 371 (c)(1),
(2) Date: Apr. 16, 2020

(87) PCT Pub. No.: WO2019/078480
PCT Pub. Date: Apr. 25, 2019

(65) Prior Publication Data
US 2021/0200032 A1 Jul. 1, 2021

(30) Foreign Application Priority Data
Oct. 16, 2017 (KR) .................. 10-2017-0133752

(51) Int. Cl.
*G02F 1/13357* (2006.01)
*G02F 1/1335* (2006.01)

(52) U.S. Cl.
CPC .. *G02F 1/133606* (2013.01); *G02F 1/133526* (2013.01); *G02F 1/133531* (2021.01); *G02F 2201/38* (2013.01)

(58) Field of Classification Search
CPC ................................. G02F 1/133606
See application file for complete search history.

(56) References Cited

U.S. PATENT DOCUMENTS

2002/0159003 A1* 10/2002 Sato ................. G02F 1/133504
349/65
2011/0116014 A1 5/2011 Lee et al.

FOREIGN PATENT DOCUMENTS

JP 2010-134345 A 6/2010
KR 10-0827962 B1 5/2008
(Continued)

OTHER PUBLICATIONS

Communication dated Sep. 14, 2020, from the European Patent Office in counterpart European Application No. 18868018.5.
(Continued)

*Primary Examiner* — Edmond C Lau
(74) *Attorney, Agent, or Firm* — Sughrue Mion, PLLC

(57) ABSTRACT

Disclosed herein is a display apparatus. The display apparatus includes a backlight unit emitting light forward, a liquid crystal panel disposed in front of the backlight unit and having a front polarizing film, and a diffusion film disposed in front of the liquid crystal panel, wherein the diffusion film includes a first refraction layer having a lens portion projecting forward, a second refraction layer disposed in front of the first refraction layer, a retardation member disposed at a front end of the lens portion, and a film polarizing layer disposed in front of the retardation member.

14 Claims, 10 Drawing Sheets

(56) References Cited

FOREIGN PATENT DOCUMENTS

| KR | 10-2010-0041974 A | 4/2010 |
| KR | 10-1447216 B1 | 10/2014 |
| KR | 10-1781206 B1 | 9/2017 |
| WO | 2006112325 A1 | 10/2006 |

OTHER PUBLICATIONS

International Search Report (PCT/ISA/210) dated Dec. 26, 2018 by the International Searching Authority in counterpart International Patent Application No. PCT/KR2018/010065.

Written Opinion (PCT/ISA/237) dated Dec. 26, 2018 by the International Searching Authority in counterpart International Patent Application No. PCT/KR2018/010065.

Communication dated May 25, 2021 by the European Patent Office in counterpart European Patent Application No. 18868018.5.

* cited by examiner

DISPLAY APPARATUS

TECHNICAL FIELD

The present disclosure relates to a display apparatus, and more particularly, to a display apparatus having an improved contrast ratio.

BACKGROUND ART

Generally, a display apparatus is a kind of an output apparatus that visually displays acquired or stored image information to a user, and is used in various fields such as home or workplace.

For example, the display apparatus includes a monitor apparatus connected to a personal computer or a server computer, a portable computer device, a navigation terminal device, a general television apparatus, an Internet Protocol television (IPTV) device, a smart phone, a tablet PC, a portable terminal device such as a personal digital assistant (PDA) or a cellular phone, various display apparatuses used to reproduce images such as advertisements or movies in an industrial field, or in addition to various kinds of audio/video systems.

The display apparatus may display images using various kinds of display panels. For example, the display apparatus may include a cathode ray tube panel, a light emitting diode (LED) panel, an organic light emitting diode (OLED) panel, a liquid crystal display (LCD) panel, and the like.

DISCLOSURE

Technical Problem

Therefore, it is an aspect of the present disclosure to provide a display apparatus having an improved contrast ratio.

It is another aspect of the present disclosure to provide a display apparatus capable of increasing a black color depth.

It is another aspect of the present disclosure to provide a display apparatus having an improved viewing angle.

It is another aspect of the present disclosure to provide a display apparatus capable of preventing occurrence of Moiré patterns.

Additional aspects of the disclosure will be set forth in part in the description which follows and, in part, will be obvious from the description, or may be learned by practice of the disclosure.

Technical Solution

In accordance with an aspect of the present disclosure, a display apparatus includes a backlight unit emitting light forward, a liquid crystal panel disposed in front of the backlight unit and having a front polarizing film, and a diffusion film disposed in front of the liquid crystal panel, wherein the diffusion film includes, a first refraction layer having a lens portion projecting forward, a second refraction layer disposed in front of the first refraction layer, a retardation member disposed at a front end of the lens portion, and a film polarizing layer disposed in front of the retardation member.

The lens portion may include a plurality of lenses, and at least some of the pluralities of lenses may have different sizes or shapes from each other.

The lens portion may include a light incident portion near the liquid crystal panel and a light emitting portion near the film polarizing layer, and a size of the light incident portion may be larger than a size of the light emitting portion.

The lens portion may include an incidence surface configured to connect the light incident portion and the light emitting portion and provided with a curved surface.

The incident surface may be convex toward the second refraction layer.

The second refraction layer may be disposed between the pluralities of lenses.

The retardation member may be arranged to rotate the polarization axis of light passing through the retardation member by 90°.

The display apparatus may further include a retardation layer disposed between the second refraction layer and the film polarizing layer.

The retardation member may be provided to rotate the polarization axis of light passing through the retardation member by 45°, and the retardation layer may be arranged to rotate the polarization axis of light passing through the retardation layer by 45°.

The second refraction layer may include a material absorbing light.

The display apparatus may further include a retardation layer disposed between the second refraction layer and the film polarizing layer, wherein the retardation member may be provided to rotate the polarization axis of light passing through the retardation member by 45°, and the retardation layer may be provided to rotate the polarization axis of light passing through the retardation layer by 45°.

The film polarizing layer may be configured to have a polarization axis perpendicular to the front polarizing film.

The second refraction layer may have a lower refractive index than the first refraction layer.

The display apparatus may further include an anti-reflection film or an anti-glare film disposed in front of the film polarizing layer.

In accordance with another aspect of an example embodiment, a display apparatus includes a liquid crystal panel having a front polarizing film, and a diffusion film disposed in front of the liquid crystal panel, wherein the diffusion film includes, a first refraction layer having a plurality of lenses protruding forward and having different sizes or shapes from each other, a second refraction layer disposed between the plurality of lenses and having a lower refractive index than the first refraction layer, a retardation member disposed at a front end of the lens portion, and a film polarizing layer disposed in front of the retardation member.

The lens portion may include a light incident portion near the liquid crystal panel and a light emitting portion near the film polarizing layer, and a size of the light incident portion may be larger than a size of the light emitting portion.

The display apparatus may further include a retardation layer disposed between the second refraction layer, the retardation member, and the film polarizing layer, wherein the retardation member may be provided to rotate the polarization axis of light passing through the retardation member by 45°, and the retardation layer may be provided to rotate the polarization axis of light passing through the retardation layer by 45°.

The second refraction layer may include a material absorbing light.

In accordance with still another aspect of an example embodiment, a display apparatus includes a backlight unit emitting light forward, a liquid crystal panel disposed in front of the backlight unit and having a front polarizing film, and a diffusion film disposed in front of the liquid crystal panel, wherein the diffusion film includes, a first refraction layer having a lens portion projecting forward, a second refraction layer disposed in front of the first refraction layer and having a lower refractive index than the first refraction layer, a retardation member disposed at a front end of the lens portion, and a film polarizing layer disposed in front of the retardation member and configured to have a polarization axis perpendicular to the front polarizing film.

The lens portion may include a plurality of lenses in which an incident surface of light provided from the backlight unit is formed in a curved surface, and at least some of the pluralities of lenses may have different sizes or shapes from each other.

Advantageous Effects

As is apparent from the above description, the display apparatus can improve the contrast ratio as the diffusion film transmits substantially vertically incident light among the light incident from the backlight unit and blocks obliquely incident light among the light incident from the backlight unit.

As is apparent from the above description, the display apparatus can increase the color depth of black because the diffusion film can block or absorb external light.

As is apparent from the above description, the display apparatus can improve the viewing angle because a plurality of lenses of the diffusion film refracts and diffuses the vertically incident light.

As is apparent from the above description, the display apparatus can prevent the occurrence of moiré fringes because the lenses having different sizes and/or shapes are arranged in an irregular pattern.

DESCRIPTION OF DRAWINGS

These and/or other aspects of the disclosure will become apparent and more readily appreciated from the following description of the embodiments, taken in conjunction with the accompanying drawings of which.

BEST MODE

Modes of the Invention

Figure 1:
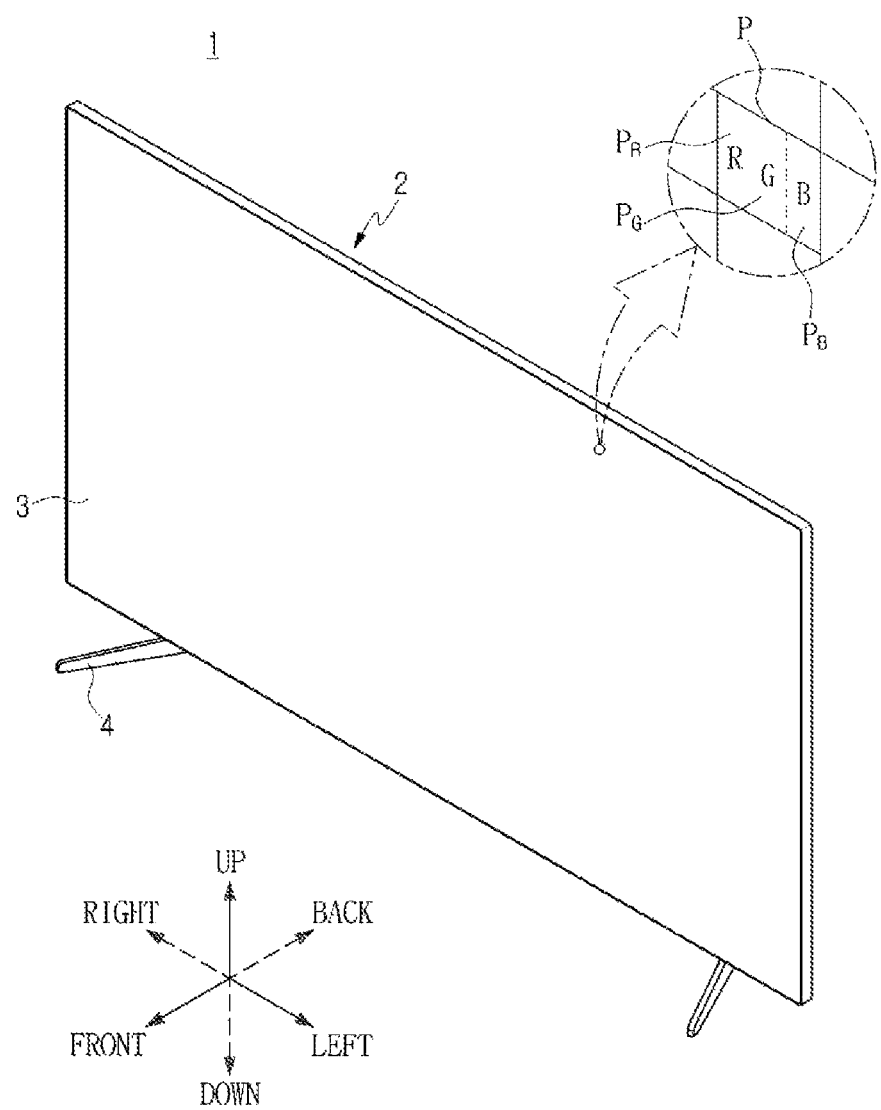
FIG. 1 is a view showing an appearance of a display apparatus according to an embodiment of the present disclosure.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted. The terms 'unit, module, member, or block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes connected to the other element via a wireless communication network.

Also, it is to be understood that the terms "include" or "have" are intended to indicate the existence of elements disclosed in the specification, and are not intended to preclude the possibility that one or more other elements may exist or may be added.

Throughout the specification, when a certain member is described as being "on" another member, both a case in which still another member is present between the two members as well as a case in which the certain member is in contact with the other member are included therein.

In this specification, terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, an action principle and embodiments will be described with reference to the accompanying drawings.

Figure 2:
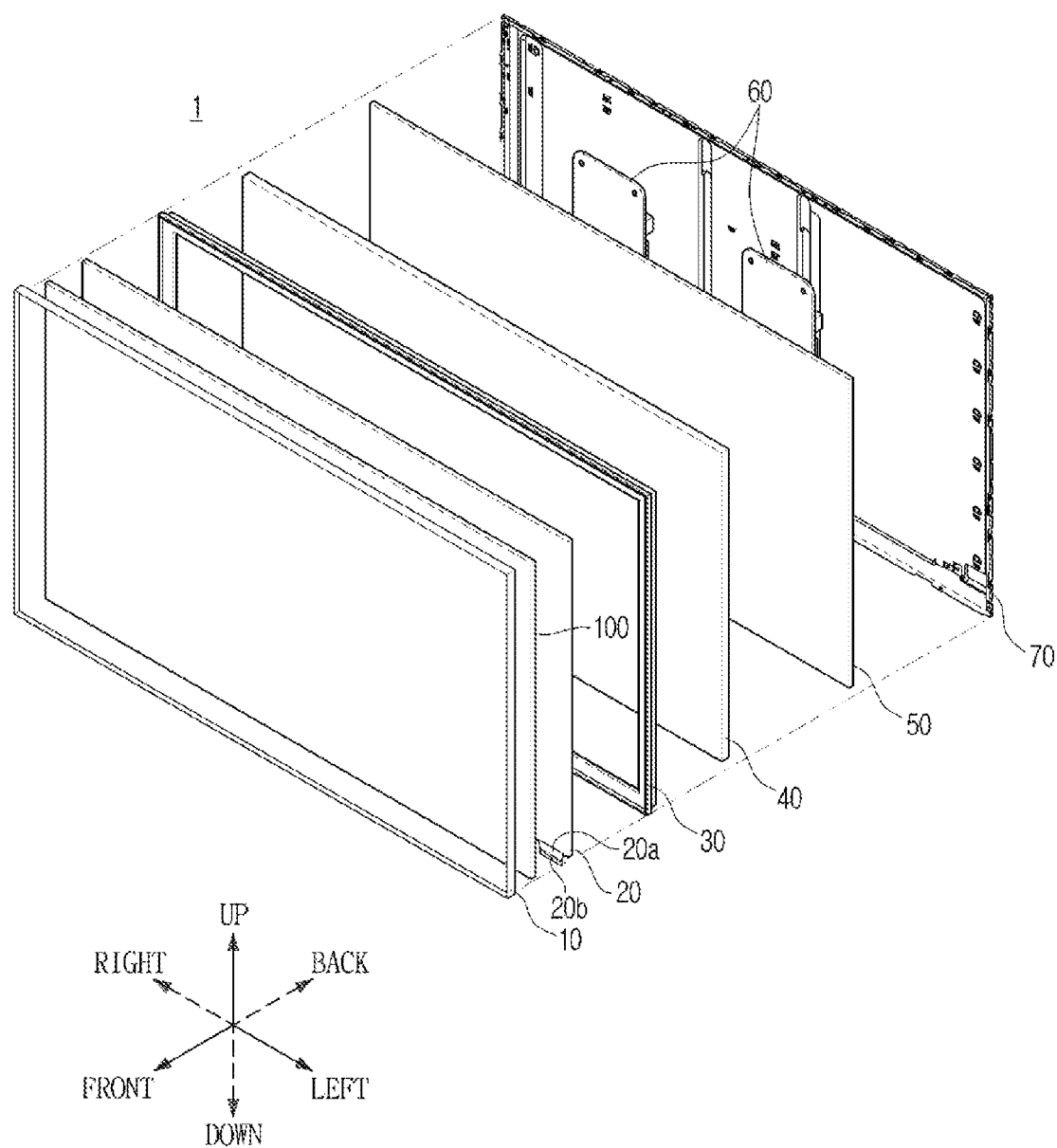
FIG. 2 is an exploded view of the display apparatus shown in FIG. 1.
Figure 3:
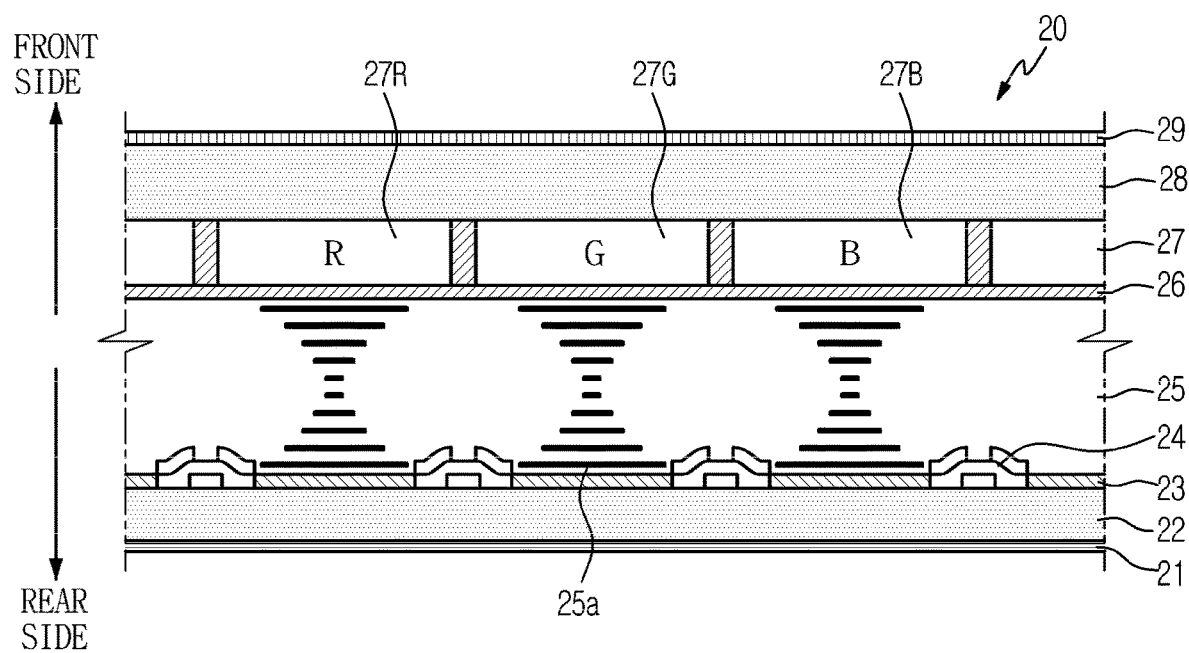
FIG. 3 is a view showing an example of an liquid crystal panel shown in FIG. 2.

FIG. 1 is a view showing an appearance of a display apparatus according to an embodiment of the present disclosure. FIG. 2 is an exploded view of the display apparatus shown in FIG. 1. FIG. 3 is a view showing an example of a liquid crystal panel shown in FIG. 2.

The display apparatus 1 is a device that processes a video signal received from the outside and visually displays the processed video image. Hereinafter, a case where the display apparatus 1 is a television is exemplified, but the present disclosure is not limited thereto. For example, the display apparatus 1 may be implemented in various forms such as a monitor, a portable multimedia device, a portable communication device, and a portable computing device, and the display apparatus 1 is not limited in its shape as long as it is an apparatus capable of visually displaying an image.

In addition, the display apparatus 1 may be a large display apparatus (Large Format Display, LFD) installed in the outdoors such as a building roof or a bus stop. It is not necessary that he outdoors is limited to the outside of the house, and thus a display apparatus 1 according to an embodiment of the present disclosure may be installed in an indoor space where a large number of people may enter and leave, such as a subway station, a shopping mall, a movie theater, a company, and a shop.

The display apparatus 1 may receive video signals and audio signals from various content sources, and may output videos and sounds corresponding to video signals and audio signals. For example, the display apparatus 1 may receive television broadcast content via a broadcast reception antenna or a wired cable. In addition to, the display apparatus 1 may receive content from a content reproduction apparatus or a content providing server of the content provider.

The display apparatus 1 may include a main body 2, a screen 3 to display an image, a support 4 provided below the main body 2 to support the main body 2, as shown in FIG. 1.

The main body 2 forms an outer shape of the display apparatus 1 and a component for displaying an image by the display apparatus 1 may be provided inside the main body 2. Although the main body shown in FIG. 1 is in the form of a flat plate, the shape of the main body is not limited to that shown in FIG. 1. For example, the main body may have a shape in which the left and right ends protrude forward and the central portion is curved so as to be concave.

The screen 3 is formed on the front surface of the main body 2, and the screen 3 may display visual information. For example, a still image or a moving image may be displayed on the screen 3, and a two-dimensional plane image or a three-dimensional image may be displayed.

A plurality of pixels P is formed on the screen 3 and an image displayed on the screen 3 may be formed by a combination of the light of beams emitted from the plurality of pixels P. For example, a single image may be formed on the screen 3 by combining the light emitted by the plurality of pixels P as a mosaic.

Each of the plurality of pixels P may emit light of various brightness and various colors.

In order to emit light of various brightness, each of the plurality of pixels P may include a configuration (for example, an organic light emitting diode) capable of emitting light directly or a configuration (for example, a liquid crystal panel) capable of transmitting or blocking light emitted by a backlight unit or the like.

In order to emit light of various colors, each of the plurality of pixels P may include sub-pixels $P_R$, $P_G$, $P_B$.

The sub-pixels PR, PG, PB may include a red sub-pixel PR capable of emitting red light, a green sub-pixel PG capable of emitting green light, and a blue sub-pixel PB capable of emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub-pixel PR, the green light of the green sub-pixel PG and the blue light of the blue sub-pixel PB, each of the plurality of pixels P may emit light of various brightness and various colors.

Although the screen 3 shown in FIG. 1 is in the form of a flat plate, the shape of the screen 3 is not limited to that shown in FIG. 1. For example, depending on the shape of the main body 2, the screen 3 may have a shape in which the left and right ends protrude forward and the center portion is curved so as to be concave.

The support 4 is installed below the main body 2 so that the main body 2 may stably maintain its position on the floor. Alternatively, the support 4 may be provided on the rear side of the main body 2 so that the main body 2 can be firmly fixed to the wall.

As shown in FIG. 2, in the main body 2, various components for generating the image I on the screen 3 may be provided.

For example, the main body 2 is provided with a backlight unit 40 for emitting surface light forward, a liquid crystal panel 20 which blocks or transmits the light emitted from the backlight unit 40, a power supply/control unit 60 to control the operation of the backlight unit 40 and the liquid crystal panel 20. In addition, the main body 2 is further provided with a bezel 10, a frame middle mold 30, a bottom chassis 50 and a rear cover 70 for supporting and fixing the liquid crystal panel 20, the backlight unit 40, and the power supply/control unit 60. A diffusion film 100 may be disposed in front of the liquid crystal panel 20. The details of the diffusion film 100 will be described later.

The backlight unit 40 may include a point light source that emits monochromatic light or white light, and may refract, reflect, and scatter light to convert light emitted from the point light source into uniform surface light.

For example, the backlight unit 40 may include a light source emitting monochromatic light or white light, a light guide plate through which light is incident from the light source and diffuses the incident light, a reflective sheet that reflects light emitted from the rear surface of the light guide plate, and an optical sheet for refracting and scattering the light emitted from the front surface of the light guide plate.

Like this, the backlight unit 40 may emit uniform surface light toward the front by refracting, reflecting, and scattering the light emitted from the light source.

The liquid crystal panel 20 is provided in front of the backlight unit 40 and blocks or transmits light emitted from the backlight unit 40 to form an image.

The front surface of the liquid crystal panel 20 forms the screen 3 of the display apparatus 1 described above and may be composed of a plurality of pixels P. The plurality of pixels P included in the liquid crystal panel 20 may independently block or transmit the light of the backlight unit 40, and the light transmitted by the plurality of pixels P may form an image to be displayed on the display apparatus 1.

For example, as shown in FIG. 3, the liquid crystal panel 20 may include a rear polarizing film 21, a first transparent substrate 22, a pixel electrode 23, a thin film transistor 24, a liquid crystal layer 25, a common electrode 26, a color filter 27, a second transparent substrate 28, and a front polarizing film 29.

The first transparent substrate 22 and the second transparent substrate 28 may fix and support the pixel electrode 23, the thin film transistor 24, the liquid crystal layer 25, the common electrode 26, and the color filter 27. The first and second transparent substrates 22 and 28 may be made of tempered glass or transparent resin.

The rear polarizing film 21 and the front polarizing film 29 are provided outside the first and second transparent substrates 22 and 28, respectively.

The rear polarizing film 21 and the front polarizing film 29 may transmit specific light and block other light, respectively.

The light may be a pair of an electric field and a magnetic field that oscillate in a direction perpendicular to the traveling direction. The electric field and the magnetic field forming the light may vibrate in all directions orthogonal to the traveling direction of light, and the vibration direction of the electric field and the vibration direction of the magnetic field may be orthogonal to each other.

For example, the rear polarizing film 21 transmits light having a magnetic field oscillating in a first direction and blocks other light. In addition, the front polarizing film 29 transmits light having a magnetic field oscillating in a second direction and blocks other light. At this time, the first direction and the second direction may be orthogonal to each other. In other words, the polarizing direction of the light transmitted by the rear polarizing film 21 and the oscillating direction of the light transmitted by the front polarizing film 29 are orthogonal to each other. As a result, generally, light may not pass through both the rear polarizing film 21 and the front polarizing film 29 at the same time.

The color filter 27 may be provided inside the second transparent substrate 28.

The color filter 27 may include a red filter 27R that transmits red light, a green filter that transmits green light, and a blue filter 27B that transmits blue light, and the red filter 27R, the green filter 27G and the blue filter 27B may be arranged in parallel with each other.

An area where the color filter 27 is formed corresponds to the pixel P described above. Also, an area where the red filter 27R is formed corresponds to the red sub-pixel PR, an area where the green filter 27G is formed corresponds to the green sub-pixel PG, an area where the blue filter 27B is formed corresponds to the blue sub-pixel PB.

The thin film transistor (TFT) 24 is provided on the inner side of the second transparent substrate 22. For example, the thin film transistor 24 may be provided at a position corresponding to the boundary between the red filter 27R, the green filter 27G and the blue filter 27B.

The thin film transistor 24 may transmit or block the current flowing through the pixel electrode 23, described below. For example, an electric field may be formed or removed between the pixel electrode 23 and the common electrode 26 in accordance with the turning on (closing) or turning off (opening) of the thin film transistor 24.

The thin film transistor 24 may be composed of a polysilicon and the thin film transistor 24 may be formed by a semiconductor process such as lithography, deposition, or ion implantation process.

The pixel electrode 23 may be provided on the inner side of the first transparent substrate 22 and the common electrode 26 may be provided on the inner side of the second transparent substrate 28.

The pixel electrode 23 and the common electrode 26 are made of a conductive metal and may generate an electric field for changing the arrangement of liquid crystal molecules 25a forming the liquid crystal layer 25 described below.

The pixel electrode 23 may be formed in an area corresponding to the red filter 27R, the green filter 27G and the blue filter 27B, and the common electrode 26 may be formed on the entire liquid crystal panel 20. As a result, an electric field may be selectively formed in the liquid crystal layer 25 depending on the position of the pixel electrode 23.

The pixel electrode 23 and the common electrode 26 may be made of a transparent material and transmit light incident from the outside. For example, the pixel electrode 23 and the common electrode 26 may be formed of indium tin oxide (ITO), indium zinc oxide (IZO), Ag nano wire, a carbon nano tube (CNT), graphene, 3,4-ethylenedioxythiophene (PEDOT), or the like.

The liquid crystal layer 25 is formed between the pixel electrode 23 and the common electrode 26, and the liquid crystal layer 25 is filled with the liquid crystal molecules 25a.

The liquid crystal represents an intermediate state between a solid (crystal) and a liquid. In general, when a solid material is heated, the state changes from a solid state to a transparent liquid state at the melting temperature. On the other hand, when heat is applied to a liquid crystal material in a solid state, the liquid crystal material changes to a transparent liquid state after changing into an opaque and turbid liquid at the melting temperature. Most of such liquid crystal materials are organic compounds, and their molecular shapes are elongated and rod-shapes, and the arrangement of molecules is the same as an irregular state in any direction, but may have a regular crystalline form in the other direction. As a result, the liquid crystal has both fluidity of liquid and optical anisotropy of crystal (solid).

The liquid crystal may also have optical properties depending on the change of the electric field. For example, the direction of the molecular arrangement of the liquid crystal may change depending on the change of the electric field.

When an electric field is generated in the liquid crystal layer 25, the liquid crystal molecules 25a of the liquid crystal layer 25 may be arranged in the direction of the electric field and when no electric field is generated in the liquid crystal layer 25, the liquid crystal molecules 25a may be arranged irregularly or disposed along an alignment layer (not shown).

As a result, the optical properties of the liquid crystal layer 25 may vary depending on the presence of an electric field passing through the liquid crystal layer 25. For example, when no electric field is formed in the liquid crystal layer 25, the light polarized by the rear polarizing film 21 may not pass through the front polarizing film 29 after passing through the liquid crystal layer 25 due to the arrangement of the liquid crystal molecules 25a of the liquid crystal layer 25. On the other hand, when an electric field is formed in the liquid crystal layer 25, the arrangement of the liquid crystal molecules 25a of the liquid crystal layer 25 changes and the light polarized by the rear polarizing film 21 may pass through the front polarizing film 29.

The liquid crystal panel 20 may be formed in a Vertical Alignment (VA) type or an In-Plane Switching (IPS) type according to the arrangement of the liquid crystal molecules 25a.

In a liquid crystal panel of the VA type, the liquid crystal molecules are aligned in the vertical direction, and when the voltage is applied, the liquid crystal molecules are rotated so as to be aligned in the horizontal direction. That is, when a voltage is not applied to the VA-type liquid crystal panel, the light passing through the rear polarizing film 21 enters the front polarizing film 29 while having a polarization, so the light is completely blocked. On the other hand, when a voltage is applied to the liquid crystal panel, the light passes through the liquid crystal molecules and changes its polarization so that it may pass through the front polarizing film 29.

In the liquid crystal panel of the IPS type, the liquid crystal molecules are horizontally aligned, and when the voltage is applied, the liquid crystal molecules rotate about the axis perpendicular to the polarizing films 21 and 29 and change their directions.

In the liquid crystal panel of the VA type, liquid crystal molecules are aligned on the polarization axis, but in the liquid crystal panel of the IPS type, liquid crystal molecules are spaced apart from the polarization axis.

The power supply/control unit 60 may include a power supply circuit to supply power to the backlight unit 40 and the liquid crystal panel 20, and a control circuit to control the operation of the backlight unit 40 and the liquid crystal panel 20.

The power supply circuit may supply power to the backlight unit 40 so that the backlight unit 40 emits surface light and may supply power to the liquid crystal panel 20 so that the liquid crystal panel 20 transmits or blocks the light.

The control circuit may control the backlight unit 40 to adjust the intensity of the light emitted by the backlight unit 40 and may control the liquid crystal panel 20 so that the image is displayed on the screen 3.

For example, the control circuit may control the liquid crystal panel 20 to display images by video signals received from content sources. Each of the plurality of pixels P included in the liquid crystal panel 20 transmits or blocks light according to the image data of the control circuit so that the image I is displayed on the screen 3.

The power supply/control unit 60 may be implemented as a printed circuit board and various circuits mounted on a printed circuit board. For example, the power supply circuit may include a capacitor, a coil, a resistance element, a microprocessor, and the like, and a power supply circuit board on which the capacitor, the coil, the resistance element, and the microprocessor are mounted. Further, the control circuit may include a memory, a microprocessor and a control circuit board on which the memory and the microprocessor are mounted.

A cable 20a to transfer image data from the power supply/control unit 60 to the liquid crystal panel 20 and a display driver integrated circuit (DDI) 20b (hereinafter, referred to as 'display drive unit') to process image data are provided between the liquid crystal panel 20 and the power supply/control unit 60.

The cable 20a may electrically connect the power supply/control unit 60 and the display drive unit 20b and electrically connect the display drive unit 20b and the liquid crystal panel 20.

The display drive unit 20b may receive image data from the power supply/control unit 60 via the cable 20a and transmit the image data to the liquid crystal panel 20 via the cable 20a.

The cable 20a may be embodied as a film cable which is bendable by an external force, and the cable 20a and the display drive unit 20b may be integrally formed of a film cable, a chip on file (COF), a tape carrier package (TCP), or the like. In other words, the display drive unit 20b may be disposed on the cable 20a.

However, the present disclosure is not limited thereto, and the display drive unit 20b may be disposed on the first transparent substrate 22 of the liquid crystal panel 20.

Figure 4:
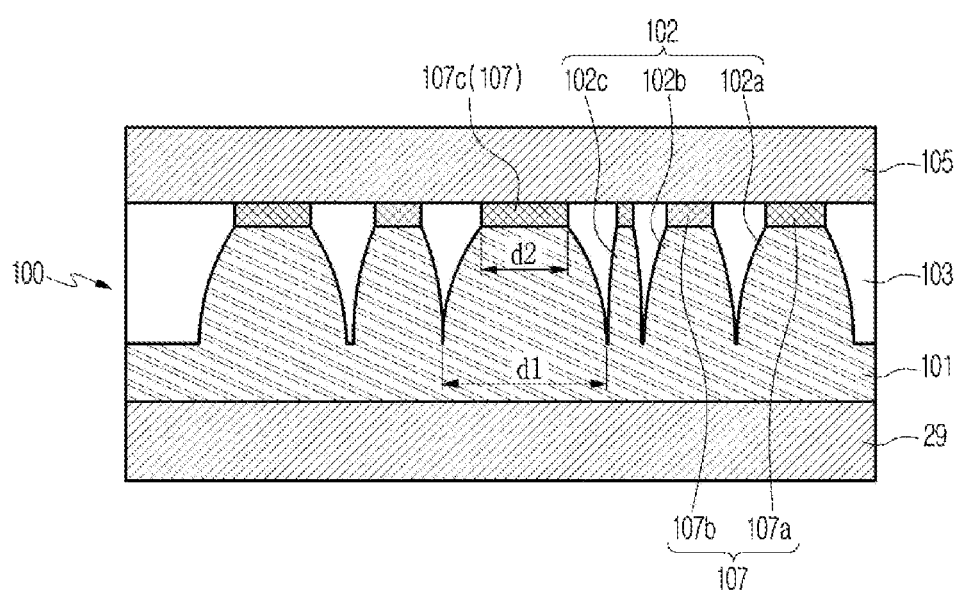
FIG. 4 is a view showing a portion of a diffusion film and the liquid crystal panel shown in FIG. 2.
Figure 5:
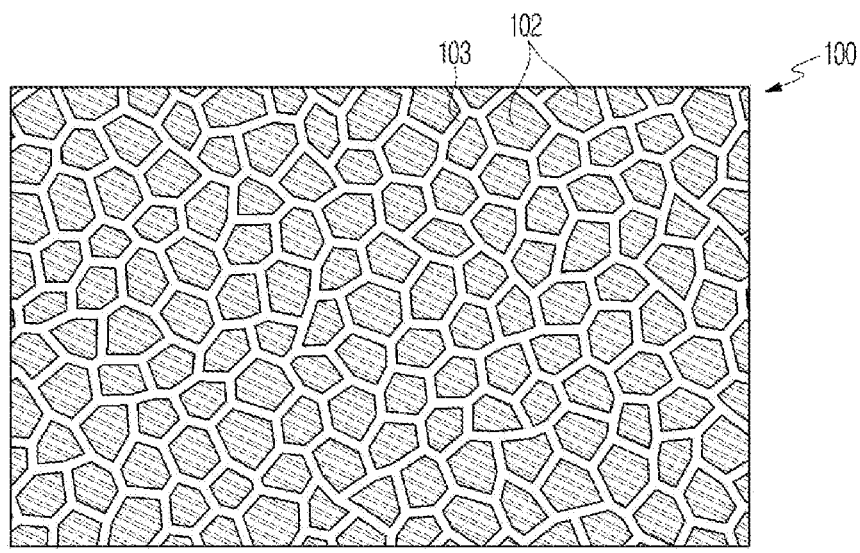
FIG. 5 is a front view of a first refraction layer and a second refraction layer of the diffusion film shown in FIG. 4.
Figure 6:
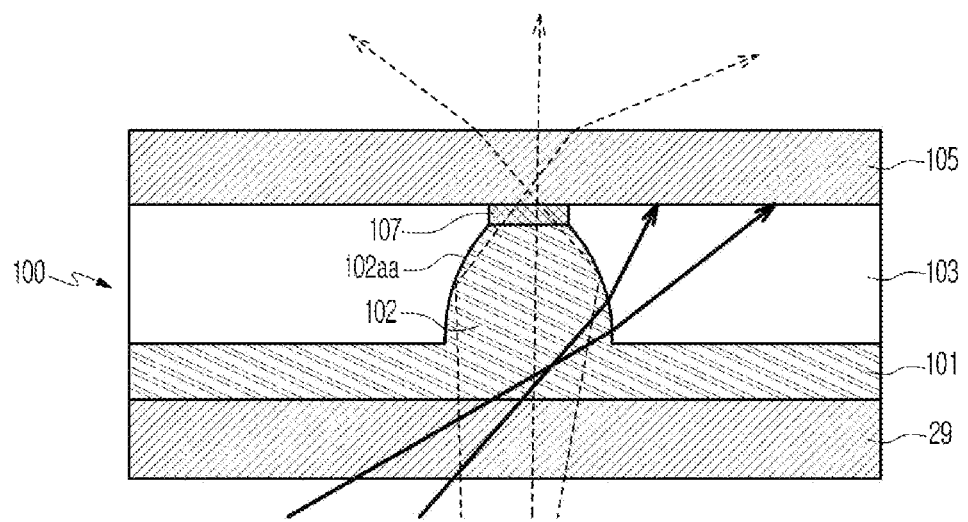
FIG. 6 is a view showing the operation of light passing through the diffusion film shown in FIG. 4.

FIG. 4 is a view showing a portion of a diffusion film and the liquid crystal panel shown in FIG. 2. FIG. 5 is a front view of a first refraction layer and a second refraction layer of the diffusion film shown in FIG. 4. FIG. 6 is a view showing the operation of light passing through the diffusion film shown in FIG. 4.

Referring to FIGS. 4 and 5, the diffusion film 100 may be disposed in front of the liquid crystal panel 20. The diffusion film 100 may include a first refraction layer 101, a second refraction layer 103, a retardation member 107, and a film polarizing layer 105.

The first refraction layer 101 may be attached to the front polarizing film 29 of the liquid crystal panel 20. The rear surface of the first refraction layer 101 may be attached to the liquid crystal panel 20. The first refraction layer 101 may include a lens portion 102 protruding forward. The first refraction layer 101 may be configured to have a higher refractive index than the second refraction layer 103.

The lens portion 102 may include a plurality of lenses 102a, 102b, and 102c. Referring to FIG. 5, the plurality of lenses 102a, 102b, and 102c may have different sizes and/or shapes. The plurality of lenses 102a, 102b, and 102c may have an irregular polygonal shape when viewed from the front. The plurality of lenses 102a, 102b, and 102c may have different widths and/or sizes. According to this configuration, the display apparatus 1 may prevent Moiré patterns caused by interference with the pixels P regularly arranged.

The lens portion 102 may have a light incident portion having a first length d1 and a light emitting portion having a second length d2. The light incident portion is formed at a rear end portion of the lens portion 102. The light incident portion is formed at an end portion near the liquid crystal panel 20. The light emitting portion is formed at a front end portion of the lens portion 102. The light emitting portion is formed at an end portion near the film polarizing layer 105. The light emitted from the backlight unit 40 may pass through the front polarizing film 29 and enter the lens portion 102 through the light incident portion and may exit the lens portion 102 through the light emitting portion.

The size of the light incident portion may be configured to be larger than the size of the light emitting portion. An incident surface 102aa connecting the light incident portion and the light emitting portion may be provided in a curved surface. The incident surface 102aa may be formed such that light reflected by the incident surface 102aa is reflected at various angles. Accordingly, the viewing angle of the display apparatus 1 may be improved.

The second refraction layer 103 may be disposed between the plurality of lenses 102a, 102b, and 102c. The second refraction layer 103 may be disposed in front of the first refraction layer 101. The second refraction layer 103 may be provided to have a refractive index lower than that of the first refraction layer 101. Accordingly, the light incident on the incident surface 102aa of the lens portion 102 can be totally reflected when the incident angle is larger than the critical angle. The light, which is incident substantially perpendicularly to the first refraction layer 101 among the light emitted from the backlight unit 40, may be totally reflected since it is incident on the incident surface 102aa at a large incident angle. On the other hand, the light, which is obliquely incident on the first refraction layer 101 among the light emitted from the backlight unit 40, may be refracted and transmitted through the second refraction layer 103 since it is incident on the incident surface 102aa at a small incident angle.

The retardation member 107 may be disposed at the front end of the lens portion 102. The retardation member 107 may be disposed in each of the light emitting portions of the plurality of lenses 102a, 102b, and 102c. The retardation member 107 may be provided so as to correspond to the number of the plurality of lenses 102a, 102b, and 102c.

The retardation member 107 may be provided to rotate the polarization axis of light passing through the retardation member 107 by 90°. Since the film polarizing layer 105 to be described later has a polarization axis perpendicular to the front polarizing film 29, the light passing through the front polarizing film 29 may pass through the film polarizing layer 105 only when the light passes through the retardation member 107 and the polarization axis of the light has to rotate by 90°. In other words, the light is emitted forward only when it passes through the retardation member 107.

The film polarizing layer 105 may be disposed in front of the retardation member 107. The film polarizing layer 105 may be disposed in front of the second refraction layer 103. The film polarizing layer 105 may be configured to have a polarization axis perpendicular to the front polarizing film 29. Accordingly, light passing through the front polarizing film 29 may not pass through the film polarizing layer 105 immediately.

The operation of the light will be described with reference to FIG. 6. For convenience of illustration, FIG. 6 shows that the lens portion 102 includes only one lens in the first refraction layer 101, but as shown in FIG. 4, the lens portion 102 may include a plurality of lenses.

The light emitted forward from the backlight unit 40 passes through the front polarizing film 29 of the liquid crystal panel 20 and then passes through the first refraction layer 101. At this time, light, which is incident at an incident angle larger than the critical angle among the light incident on the incident surface 102aa of the lens portion 102 of the first refraction layer 101, is totally reflected on the incident surface 102aa. The total reflected light passes through the retardation member 107 and its polarization axis is rotated by 90°. That is, the total reflected light has the same polarization axis as the film polarizing layer 105. Thus, light that has passed through the retardation member 107 may pass through the film polarizing layer 105. In addition, the light totally reflected by the incident surface 102aa may be totally reflected at various angles as the incident surface 102aa is formed as a curved surface.

On the other hand, light, which is incident at an incident angle smaller than the critical angle among the light incident on the incident surface 102aa of the lens portion 102 of the first refraction layer 101, is refracted at the incident surface 102aa and passes through the second refraction layer 103. The light passing through the second refraction layer 103 has the same polarization axis as the polarization axis of the front polarizing film 29. That is, the light passing through the second refraction layer 103 has a polarization axis perpendicular to the polarization axis of the film polarizing layer 105. Thus, light that has passed through the second refraction layer 103 is absorbed in the film polarizing layer 105.

According to this configuration, the display apparatus 1 according to an embodiment of the present disclosure can improve the viewing angle and the contrast ratio. In addition, the display apparatus 1 can increase the color depth of black because the diffusion film 100 can absorb light passing obliquely through the liquid crystal panel 20.

Figure 7:
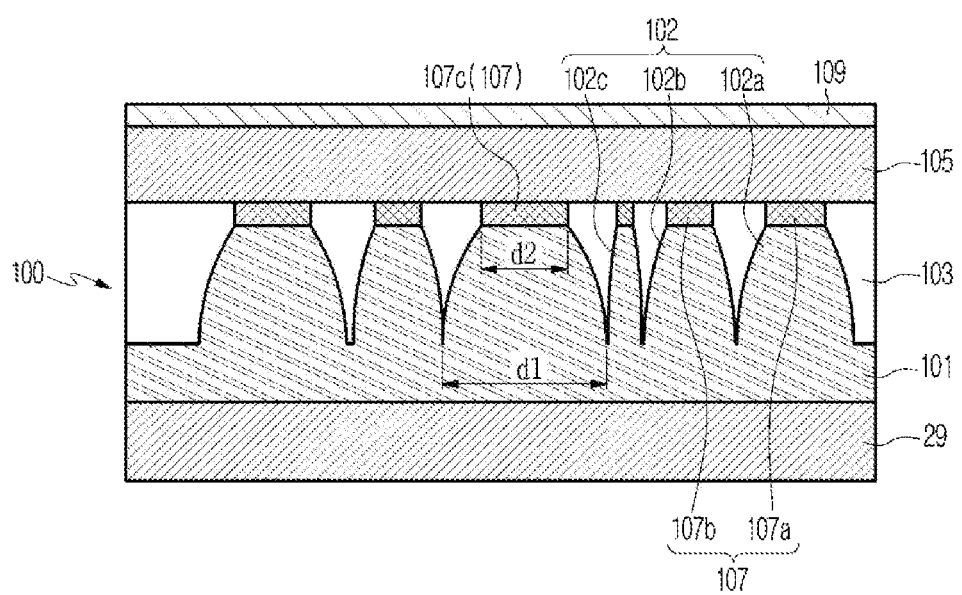
FIG. 7 is a view showing a portion of a diffusion film and a liquid crystal panel according to another embodiment.

FIG. 7 is a view showing a portion of a diffusion film and a liquid crystal panel according to another embodiment.

Referring to FIG. 7, a diffusion film 100' according to another embodiment of the present disclosure will be described. In describing the embodiment shown in FIG. 7, the same components as those shown in FIG. 4 to FIG. 6 are denoted by the same reference numerals and description thereof may be omitted.

The diffusion film 100 'may include a surface treatment layer 109 disposed in front of the film polarizing layer 105. The surface treatment layer 109 may be a low reflection film for reducing surface reflection due to external light. The surface treatment layer 109 may be an anti-glare film for preventing glare of a viewer.

Figure 8:
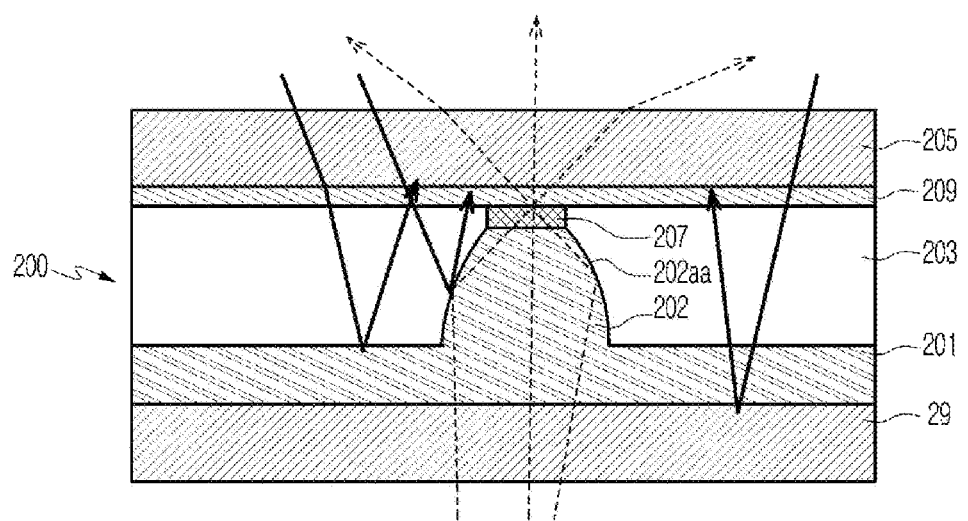
FIG. 8 is a view showing the operation of light passing through a diffusion film according to still another embodiment.

FIG. 8 is a view showing the operation of light passing through a diffusion film according to still another embodiment.

Referring to FIG. 8, a diffusion film 200 according to still another embodiment of the present disclosure will be described. In describing the embodiment shown in FIG. 8, the same components as those shown in FIG. 4 to FIG. 6 are denoted by the same reference numerals and description thereof may be omitted.

The diffusion film 200 may be disposed in front of the front polarizing film 29. The diffusion film 200 may include a first refraction layer 201, a second refraction layer 203, a film polarizing layer 205, a retardation member 207 and a retardation layer 209. Since the first refraction layer 201, the second refraction layer 203, and the film polarizing layer 205 has the same configuration as the first refraction layer 101, the second refraction layer 103, and the film polarizing layer 105 shown in FIG. 4, the description will be omitted.

The retardation member 207 may be disposed at the front end of the lens portion 202 of the first refraction layer 201. The retardation member 207 may be disposed between the lens portion 202 and the retardation layer 209. The retardation member 207 may be disposed in the light emitting portion of the lens portion 202.

The retardation member 207 may be provided to rotate the polarization axis of light passing through the retardation member 207 by 45°, unlike the retardation member 107 shown in FIG. 4.

The retardation layer 209 may be disposed in front of the second refraction layer 203. The retardation layer 209 may be disposed in front of the retardation member 207. The retardation layer 209 may be disposed between the film polarizing layer 205 and the second refraction layer 203. The retardation layer 209 may be disposed between the film polarizing layer 205 and the retardation member 207.

The retardation layer 209 may be provided to rotate the polarization axis of the light passing through the retardation layer 209 by 45° in the same manner as the retardation member 207.

According to this configuration, the diffusion film 200 shown in FIG. 8 may effectively absorb external light.

Particularly, the external light passes through the retardation layer 209 after passing through the film polarizing layer 205, and the polarization axis thereof may be rotated by 45°. The light passing through the retardation layer 209 is reflected by the first refraction layer 201 and then passes through the retardation layer 209 and its polarization axis may be rotated by 45°. That is, the polarization axis of the external light is rotated by 90° as compared with the case where the external light is incident on the diffusion film 200. Thus, external light may be absorbed in the film polarizing layer 205 without passing through the film polarizing layer 205.

On the other hand, light having an incident angle larger than a critical angle among the light emitted forward in the backlight unit 40 passes through the retardation member 207 at the incident surface 202aa and its polarization axis is rotated by 45° and then passes through the retardation layer 209 and its polarization axis is rotated by 45°, and therefore, the light may pass through the film polarizing layer 205 since the polarization axis thereof is rotated by 90 degrees as compared with when passing through the front polarizing film 29.

In addition, although not shown, light having an incident angle smaller than a critical angle among the light emitted forward in the backlight unit 40 may not pass through the film polarizing layer 205 because the polarization axis thereof is rotated only 45° even if it passes through the retardation layer 209. That is, light having an incident angle smaller than the critical angle is absorbed by the film polarizing layer 205.

Figure 9:
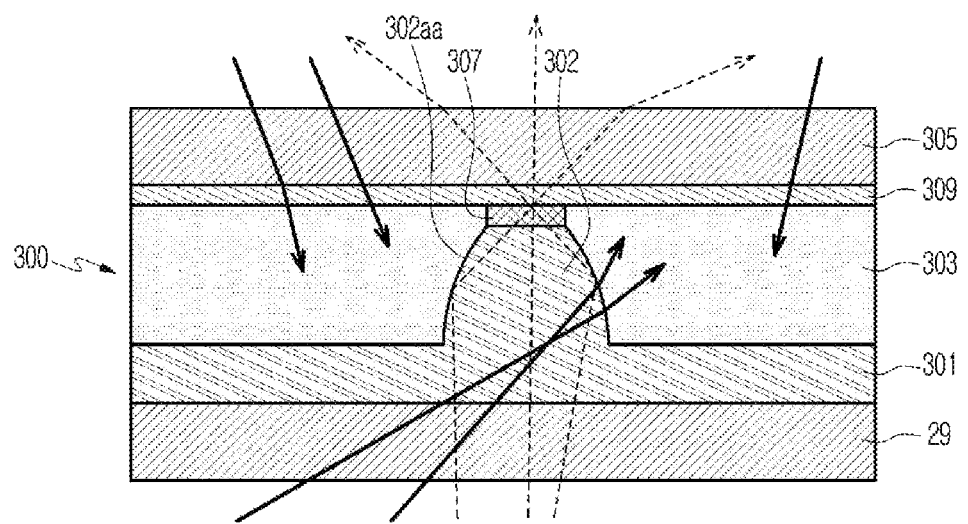
FIG. 9 is a view showing the operation of light passing through a diffusion film according to still another embodiment.

FIG. 9 is a view showing the operation of light passing through a diffusion film according to still another embodiment.

Referring to FIG. 9, a diffusion film 300 according to still another embodiment of the present disclosure will be described. In describing the embodiment shown in FIG. 9, the same reference numerals are assigned to the same components as those described above, and description thereof may be omitted.

The diffusion film 300 may be disposed in front of the front polarizing film 29. The diffusion film 300 may include a first refraction layer 301, a second refraction layer 303, a film polarizing layer 305, a retardation member 307 and a retardation layer 309. Since the first refraction layer 301, the film polarizing layer 305, the retardation member 307, and the retardation layer 309 have the same configuration as the first refraction layer 201, the film polarizing layer 205, the retardation member 207, and the retardation layer 209 shown in FIG. 8, description thereof will be omitted.

The second refraction layer 303 may be composed of a material that absorbs light. The second refraction layer 303 may be a dye layer containing a dye containing light absorbing particles. The dye may be a dark color family, for example black, and may be provided to have an appropriate concentration in consideration of a preset transmittance.

According to this configuration, the diffusion film 300 shown in FIG. 9 may effectively absorb external light and light having an incident angle smaller than a critical angle among the light emitted forward from the backlight unit 40.

Particularly, external light may be absorbed in the second refraction layer 303 after passing through the film polarizing layer 305 and the retardation layer 309. Light having a smaller incident angle than the critical angle among the light emitted forward from the backlight unit 40 may be refracted at the incident surface 302aa of the lens portion 302 of the first refraction layer 301 and may be absorbed at the second refraction layer 303.

On the other hand, light having a larger incident angle than the critical angle among the light emitted forward from the backlight unit 40 passes through the retardation member 307 at the incident surface 302aa and the polarization axis thereof is rotated by 45°, and then passes through the retardation layer 309 and its polarization axis is rotated by 45°. Therefore, the light may pass through the film polarizing layer 305 while having the polarization axis which is rotated by 90° as compared to when passing through the front polarizing film 29.

Figure 10:
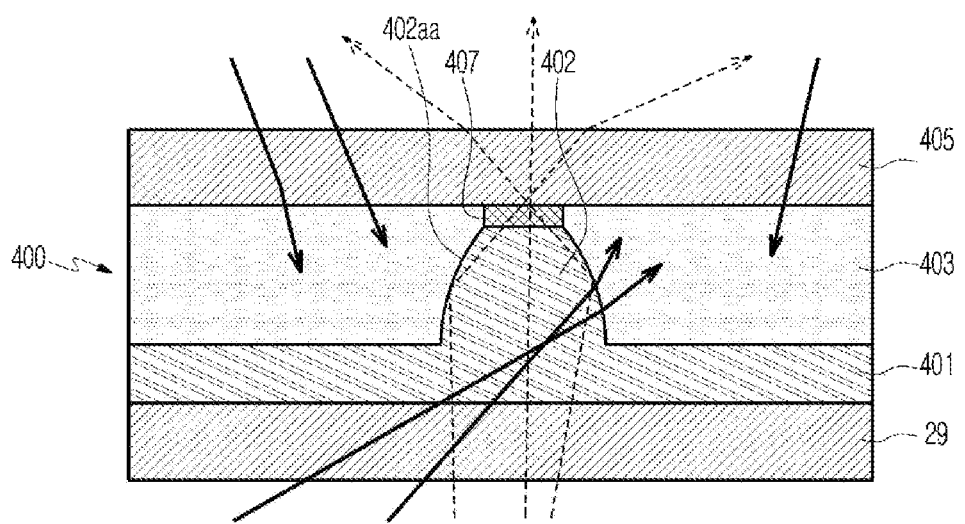
FIG. 10 is a view showing the operation of light passing through a diffusion film according to still another embodiment.

FIG. 10 is a view showing the operation of light passing through a diffusion film according to still another embodiment.

Referring to FIG. 10, a diffusion film 400 according to still another embodiment of the present disclosure will be described. In describing the embodiment shown in FIG. 10, the same reference numerals are assigned to the same components as those described above, and description thereof may be omitted.

The diffusion film 400 may be disposed in front of the front polarizing film 29. The diffusion film 400 may include a first refraction layer 401, a second refraction layer 403, a film polarizing layer 405, and a retardation member 407.

The first refraction layer 401, the second refraction layer 402, and the film polarizing layer 405 shown in FIG. 10 have the same configuration as the first refraction layer 301, the second refraction layer 303, and the film polarizing layer 305 shown in FIG. 9, and thus description thereof will be omitted.

The retardation layer may be omitted from the diffusion film 400 shown in FIG. 10, unlike the diffusion film 300 shown in FIG. 9. Accordingly, the retardation member 407 may be provided to rotate the polarization axis of light passing through the retardation member 407 by 90°.

According to this configuration, the light totally reflected by the incident surface 402aa of the lens portion 402 of the first refraction layer 401 passes through the retardation member 407 and the polarizing axis thereof is rotated by 90° to pass through the film polarizing layer 405.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A display apparatus comprising:
a backlight unit emitting light forward;
a liquid crystal panel disposed in front of the backlight unit and having a front polarizing film; and
a diffusion film disposed in front of the liquid crystal panel,
wherein the diffusion film comprises,
a first refraction layer having a lens portion projecting forward;
a second refraction layer disposed in front of the first refraction layer;
a retardation member disposed at a front end of the lens portion; and
a film polarizing layer disposed in front of the retardation member.

2. The display apparatus according to claim 1, wherein the lens portion comprises a plurality of lenses, and
at least some of the pluralities of lenses have different sizes or shapes from each other.

3. The display apparatus according to claim 1, wherein the lens portion comprises a light incident portion near the liquid crystal panel and a light emitting portion near the film polarizing layer, and
a size of the light incident portion is larger than a size of the light emitting portion.

4. The display apparatus according to claim 3, wherein the lens portion comprises an incidence surface configured to connect the light incident portion and the light emitting portion and provided with a curved surface.

5. The display apparatus according to claim 4, wherein the incident surface is convex toward the second refraction layer.

6. The display apparatus according to claim 2, wherein the second refraction layer is disposed between the pluralities of lenses.

7. The display apparatus according to claim 1, wherein the retardation member is arranged to rotate the polarization axis of light passing through the retardation member by 90°.

8. The display apparatus according to claim 1, further comprising a retardation layer disposed between the second refraction layer and the film polarizing layer.

9. The display apparatus according to claim 8, wherein the retardation member is provided to rotate the polarization axis of light passing through the retardation member by 45°, and
the retardation layer is arranged to rotate the polarization axis of light passing through the retardation layer by 45°.

10. The display apparatus according to claim 1, wherein the second refraction layer comprises a material absorbing light.

11. The display apparatus according to claim 10, further comprising a retardation layer disposed between the second refraction layer and the film polarizing layer,
- wherein the retardation member is provided to rotate the polarization axis of light passing through the retardation member by 45°, and
- the retardation layer is provided to rotate the polarization axis of light passing through the retardation layer by 45°.

12. The display apparatus according to claim 1, wherein the film polarizing layer is configured to have a polarization axis perpendicular to the front polarizing film.

13. The display apparatus according to claim 1, wherein the second refraction layer has a lower refractive index than the first refraction layer.

14. The display apparatus according to claim 1, further comprising a anti-reflection film or an anti-glare film disposed in front of the film polarizing layer.

* * * * *